United States Patent [19]

Fogaroli et al.

[11] Patent Number: 4,970,605
[45] Date of Patent: Nov. 13, 1990

[54] DIGITAL IMAGE SCANNING DEVICE HAVING AN AUTOMATIC BACKGROUND COMPENSATION CIRCUIT

[75] Inventors: Giuseppe Fogaroli, Ivrea; Ennio Sgreccia, Banchette; Giorgio Tadini, Turin, all of Italy

[73] Assignee: Ing. C. Olivetti & C., S.p.A., Ivrea, Italy

[21] Appl. No.: 309,086

[22] Filed: Feb. 6, 1989

[30] Foreign Application Priority Data

Mar. 18, 1988 [IT] Italy ............................... 67233 A/88

[51] Int. Cl.$^5$ .............................................. H04N 1/40
[52] U.S. Cl. ..................... 358/461; 358/464; 358/466
[58] Field of Search ................. 358/464, 465, 466, 461

[56] References Cited

U.S. PATENT DOCUMENTS

| 3,723,649 | 3/1973 | Pitegoff et al. | 358/465 |
| 3,790,706 | 2/1974 | Gubala et al. | 358/466 |
| 3,965,290 | 6/1976 | Tisue | 358/466 |
| 4,234,895 | 11/1980 | Sommer et al. | 358/466 |
| 4,468,704 | 8/1984 | Stoffel et al. | 358/466 |

Primary Examiner—Edward L. Coles, Sr.
Attorney, Agent, or Firm—Banner, Birch, McKie & Beckett

[57] ABSTRACT

The background compensation circuit defines a background threshold signal in dependence on an average value between the positive-peak and negative-peak signals previously received from the elements for scanning the pixels of the image, and in dependence on the analog signal (AS) of the pixel added to a reference signal. The circuit comprises two detectors (21, 22) for respectively detecting a positive peak and a negative peak and which each have a short charge time constant and a long discharge time constant. A summing circuit (25) generates a threshold signal ($V_s$) as a linear combination of the signals ($V_{max}$, $V_{min}$) of the detectors (21, 22) the analog signal (AS) of the pixel and a reference signal ($V_r$). Finally the threshold signal is compared (26) to the analog signal (AS) of the pixel to produce a binary reading signal which is at "one" level when the threshold signal is greater than the analog signal and is at "zero" level when the threshold signal is less than the analog signal.

8 Claims, 3 Drawing Sheets

DIGITAL IMAGE SCANNING DEVICE HAVING AN AUTOMATIC BACKGROUND COMPENSATION CIRCUIT

BACKGROUND OF THE INVENTION

1. Field of the Invention

The present invention relates to a circuit for automatically adjusting the background threshold of a reading signal for a digital image scanning device, comprising means for scanning the pixels, capable of generating corresponding electrical reading signals and transmitting them in series to the adjusting circuit and memory means controlled by the regulating circuit for storing digital values of the signal in binary code in dependence on the threshold, the adjusting circuit defining the threshold ($V_s$) of the signal in dependence on the positive-peak ($V_{max}$) and negative-peak ($V_{min}$) signals previously received from the scanning means.

2. Description of the Related Art.

In apparatus of the above indicated type wherein a signal produced by a photoelectric detector constituted of an array of image sensing elements such as a so called CCD device (Charge Coupled Device), an analog output signal produced by such a device must be compared against at least one threshold in order to derive therefrom a binary-type signal.

In order to obtain good performances from a scanning apparatus of this kind for scanning like office documents, it is necessary to adjust the level of the threshold which determines the digital conversion of the above said analog signal.

Several circuitries have been developed for rendering adaptive the level of the threshold in order to optimize the operation of the system.

For instance, the U.S. Pat. No. 4,251,837 discloses a circuit of the above-indicated type, which includes a switching circuit controlled by two comparators for comparing the threshold signals, in order to select three different thresholds. However that circuit is not capable of adapting the threshold to the type of image or to the background colour of the image.

U.S. Pat. No. 4,554,594 of the present assignee also discloses a variable threshold circuit for serial scanning and digital processing of images with various grey levels, in which a given threshold is selected only if it maintains a certain persistency defined by a counter. However that circuit is also not capable of adapting the threshold to the "background colour" of the image.

SUMMARY OF THE INVENTION

The object of the invention is to provide a circuit for automatically adjusting the threshold signal in dependence on a plurality of parameters including the background colour of the image.

The object of the invention is obtained by means of a circuit for automatically adjusting the background threshold of a reading signal for a digital scanning device, comprising means for scanning the pixels, capable of generating corresponding electrical reading signals and transmitting them in series to the adjusting circuit and memory means controlled by the regulating circuit for storing digital values of the signal in binary code in dependence on the threshold, the adjusting circuit defining the threshold of the signal in dependence on the positive-peak ($V_{max}$) and negative-peak ($V_{min}$) signals previously received from the scanning means.

These and others features of the invention will be more clearly apparent from the following description of a preferred embodiment of the invention given by way of non-limiting example with reference to the accompanying drawings.

DESCRIPTION OF THE PREFERRED EMBODIMENT

Figure 1:
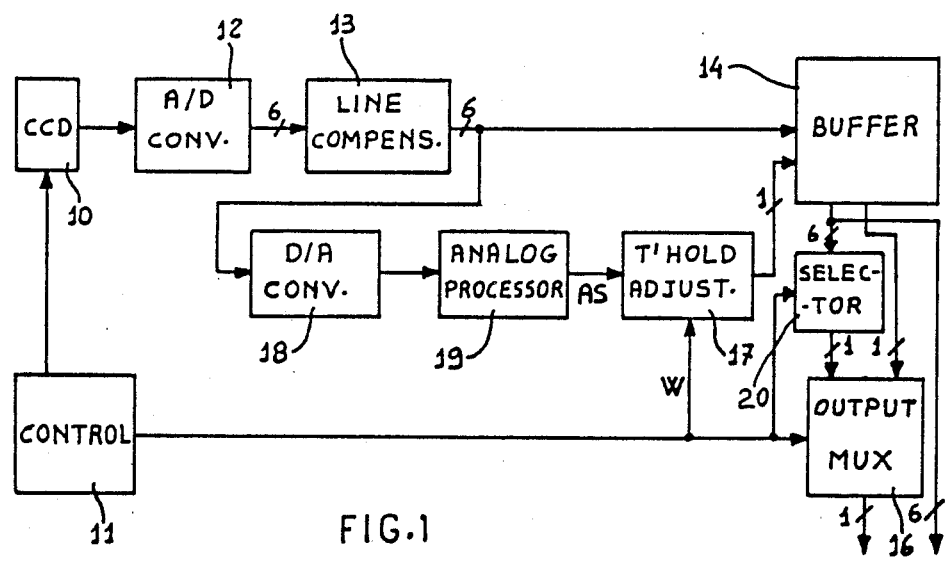
FIG. 1 diagrammatically illustrates a digital image scanning device incorporating a threshold adjusting circuit according to the invention.

Referring to FIG. 1, the scanning device comprises a series of elements 10 for reading a document, which are formed by the cells of a Charge Coupled Device, known as a CCD. For a reader for reading images in black and white, there may be provided a single series of cells of the CCD 10 which are spaced in such a way that each element can receive the light reflected from a small area of the document, referred to hereinafter as a 'pixel'.

The number of pixels per mm which is generally between 8 and 16 indicates the level of resolution of the document and may be varied under the control of a control unit 11 in per se known manner. By way of example, in the case of a document of A4 format with a level of resolution of eight pixels/mm, the CCD has a number of active cells equal to 1728.

For a reader for reading colour images, the CCD 10 is formed by three series of cells, for example associated with the three primary colours: green, red and blue, and which are capable of sending the associated signals in separate channels. In such a situation one of the CCDs 10, for example the green CCD, may be designed for digital scanning of images to be recorded in monochrome mode (black and white).

The cells of the CCD 10 generate electrical signals which, suitably amplified and filtered, are passed serially to an A/D (analog/digital) converter 12 which converts the analog signals received into a group of bits, for example siX bits. Those bits represent the digital value of the signal which may therefore be at 64 different levels.

The signals emitted by the converter 12 are passed to a digital line compensation circuit 13, for example, of the type described in the present assignee's Italian patent No. 1 183 816. The compensation circuit is operable to effect compensation in respect of the digital value of the amplitude of the signals on the basis of a digital value derived from the preliminary reading of a sample line, to take account of dust on the lamp and the errors of the sensor and the loss at the edges in respect of luminosity of the lens.

The output signals from the compensating circuit 13 are stored in the form of bytes in a buffer 14 which has the capacity to store two series of signals generated by the CCD 10. Therefore the buffer 14 has a capacity of two bytes for each pixel of a line on the document, each byte having six bits for the digital signals of each pixel. The signals which are stored in the buffer 14 are then passed to an output unit 16 connected to the user device, for example, a video unit or a printer.

In many applications, for example for documents carrying graphics or alphanumeric texts, it is sufficient to store the signals in respect of reading of the pixels in binary form in such a way as to occupy the minimum amount of memory space and in such a way that they can be reproduced in monochrome code. Because of the 'background colour' with respect to the image however a fixed definition in respect of the signal background threshold would result in a loss of information.

For the purposes of generating a binary signal for storing the reading signals in monochrome code, in accordance with the invention, the scanning device comprises a circuit 17 for automatically regulating the background threshold of the reading signal, which is capable of defining the background threshold of the signal in dependence on the previously received positive-peak and negative-peak signals. In particular the digital output signals from the compensating circuit 13 are applied to a D/A (digital-analog) converter 18 produces a perfectly calibrated corresponding analog signal on each occasion for each digital value of the six bits from the circuit 13. That calibrated signal is now passed to an analog processing circuit 19 to provide for compensation of the signals on the basis of spatial frequency, for example of the type described in the present assignee's Italian patent No. 1 183 815. That circuit is operable to compensate for the reduction in amplitude of the signal emitted by the circuit 18 at the high spatial frequencies of the signal, for example in a situation involving a high level of density of lines which alternate with white spaces, by cutting out any spatial frequencies which are outside the useful field for recording, whereby it emits a corresponding calibrated analog signal AS. The output of the circuit 19 is connected to the input of the circuit 17 which is enabled to operate under the control of the control unit 11 in a fashion which will be more clearly apparent hereinafter.

Figure 2:
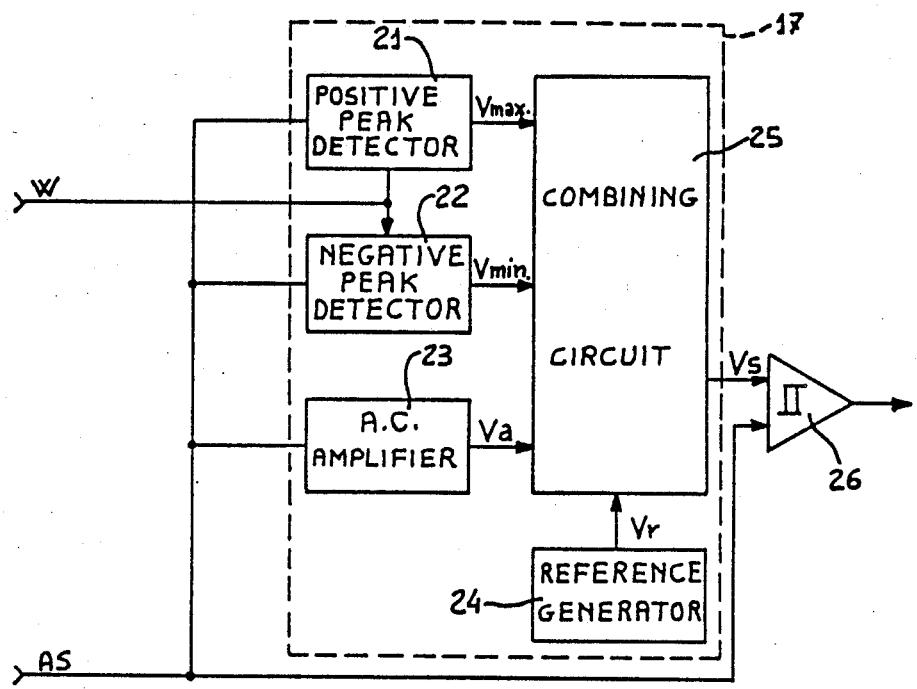
FIG. 2 is a block circuit diagram of the threshold adjusting circuit.

The circuit 17 comprises a positive-peak detector 21 (see FIG. 2) and a negative-peak detector 22. The two detectors 21 and 22 are operable to sense the analog signal supplied by the circuit 19 and output a maximum voltage Vmax and a minimum voltage Vmin respectively. The circuit 17 also comprises an AC amplifier circuit 23 which amplifies the alternating analog signal received from the circuit 19 and outputs an alternating voltage Va.

Finally the circuit 17 comprises a generator 24 for generating a reference voltage Vr and a combining circuit 25 operable to produce a voltage Vs given by a linear combination of the outputs of the blocks 21, 22 and 23 which are summed with the reference voltage Vr. A comparator 26 with hysteresis compares the output signal Vs from the circuit 25 to the signal AS from the circuit 19 in such a way as to produce a digital signal at two levels.

Figure 3:
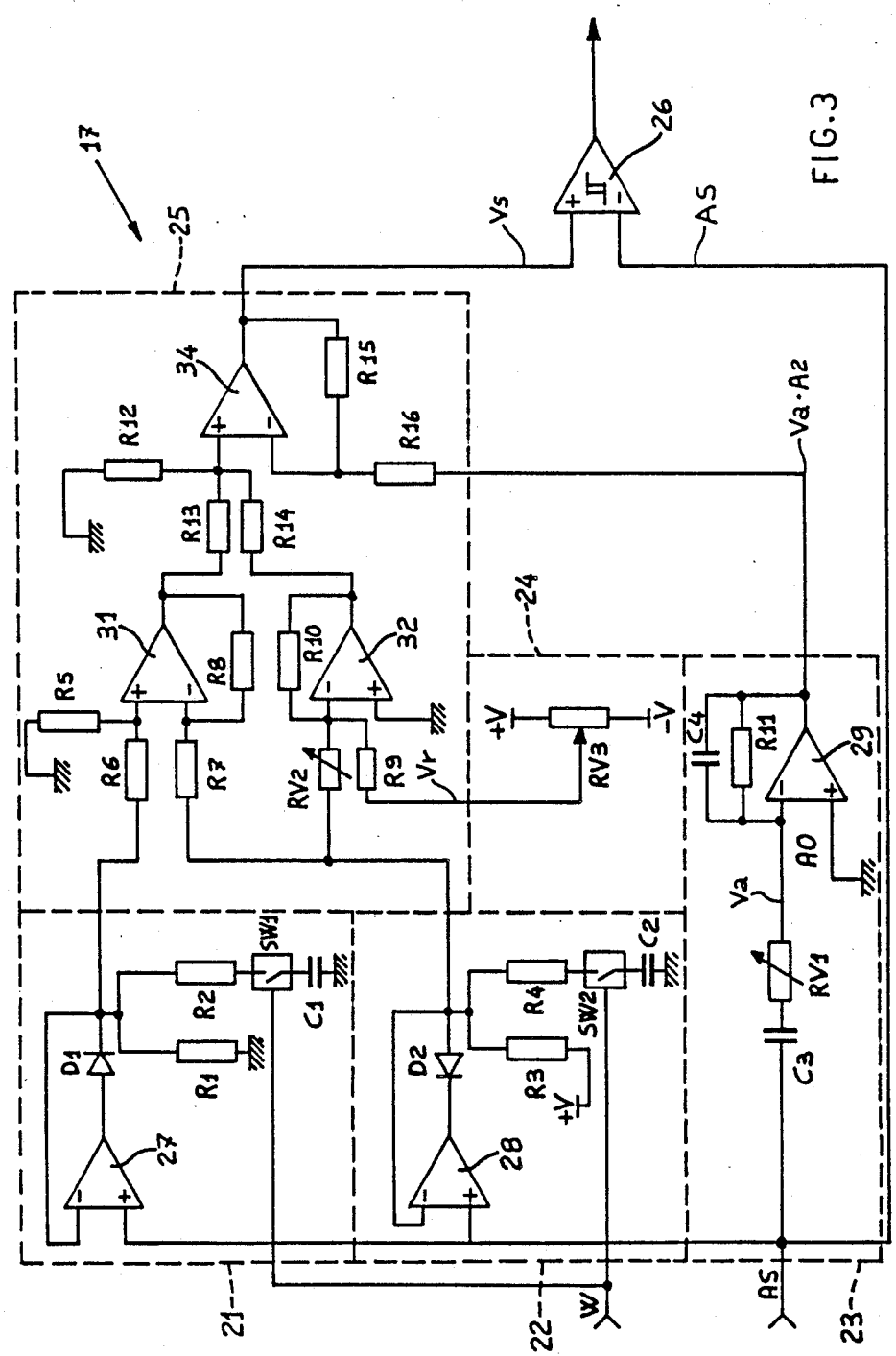
FIG. 3 is a detailed diagram of the threshold adjusting circuit shown in FIG. 2.

The two detectors 21 and 22 are enabled by the enabling command generated by the control unit 11, which may be generated as a windowing signal W which is active between the minimum and maximum coordinates of the zone of the image read. The signal W activates the threshold adjusting circuit 17 only during the operation of reading the window whereby it is inhibited both during pauses on the part of the reader and during scanning of non-significant zones of the image. For that purpose the signal W is adapted to close two switches SW1 and SW2 (FIG. 3) which are provided in the detectors 21 and 22.

Figure 4:
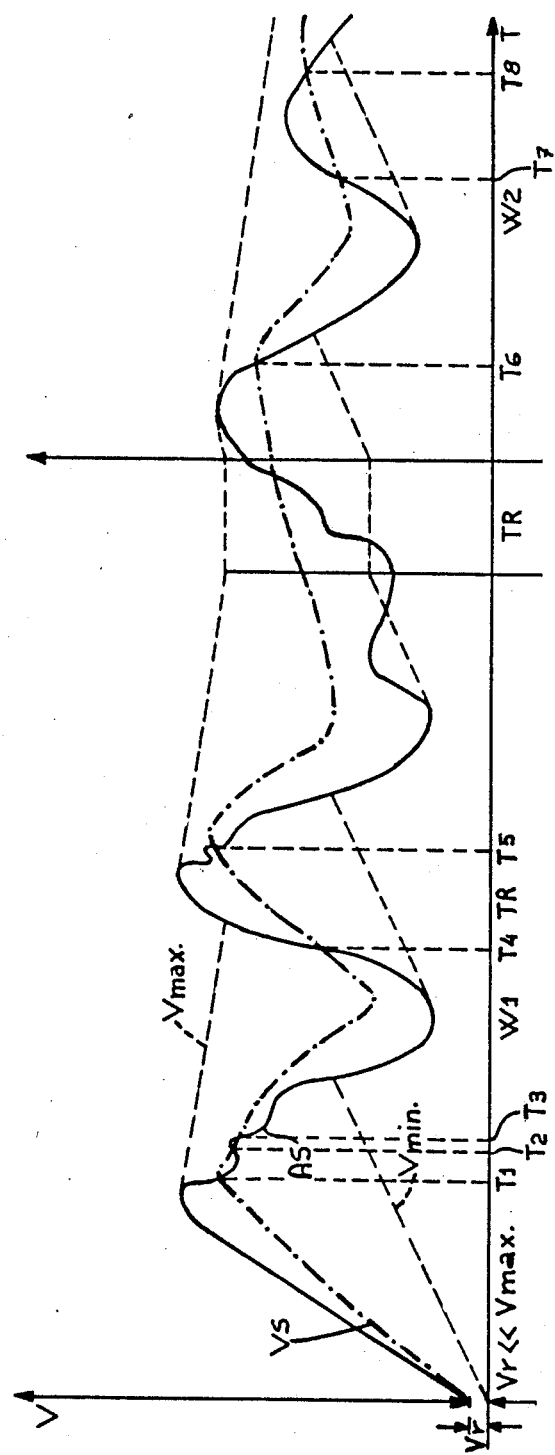
FIG. 4 is a diagram illustrating the signals which are processed in operation of the regulating circuit shown in FIG. 3.

In particular the positive-peak detector 21 comprises an operational amplifier 27 which receives the output analog signal AS from the circuit 19, a diode D1 and a capacitor C1 which, through the diode D1, a resistor R2 and the switch SW1, is charged by the positive slopes of the analog signal AS (see FIG. 4). The charge time constant of the detector 21, that is to say the time constant of the circuit C1 and R2, was selected by experiment as being equal to the reading time of four pixels on the basis of statistics in respect of the image density in standard office documents in such a way as to exclude any spurious signals of a duration of less than four pixels reading time. The positive peak of the signal AS corresponds to the generally light background of the document while the negative peak correspond to the images or characters darker than the background.

Between one positive peak and another, the capacitor C1 is discharged by way of the resistor R2 and another resistor R1 which is connected to earth, thus losing information. The discharge time constant of the detector 21 is very long and is selected to be at least 1000 times the charge time constant. In particular the time constant of the circuit C1, R1 + R2 was selected to be reading time of number of pixels of about three lines to be read, whereby the discharge takes place very slowly. Similarly the detector 22 comprises an operational amplifier 28 which receives the same analog signal AS. The detector 22 also comprises a capacitor C2 which is charged up by a constant voltage +V through two resistors R3 and R4 and the switch SW2. The detector 22 is charged by the negative slopes of the signal AS, the capacitor C2 being discharged by way of the resistor R4, the diode D2 and the output resistance of the amplifier 28. The charge time constant of the detector 22 (for discharge of the capacitor C2) is also four pixels. The negative peak of the signal AS corresponds to the character or graphic which is printed on the document.

Between one negative peak and another the capacitor C2 is slowly charged up by way of the resistors R3 and R4, discharging the detector 22 which thus loses information. The discharge time constant of the detector 22 (for charging of the capacitor C2) is at least 200 times the charge time constant but no longer than ¼ of the discharge time constant of the detector 21. In particular the discharge time constant of the detector 22 is selected to be equal to half a reading line, that is to say equal to one sixth of the discharge time constant of the detector 22.

The AC amplifier 23 is essentially formed by an operational amplifier 29, the inverting input of which receives the signal AS by way of a capacitor C3 and a variable resistor RV1. The purpose of the capacitor C3 is to block the direct-current component of the signal AS. The gain A2 of the amplifier 29 which is given by the ratio R11/RV1 is preferably selected to be between a value of 0.5 and a value of 1.

The circuit associated with the amplifier 29, by way of the capacitor C3 and the group C4, R11, provides a pass band amplifier with an upper cut-off frequency which is given by the values of C4 and R11.

The upper cut-off frequency is about one tenth of the maximum frequency of the video signal given by the working frequency of the CCD 10. With a working frequency of 1 MHz, the maximum frequency of the video signal (alternation of light and dark signals in two contiguous elements) is 500 KHz. The filter C4, R11 therefore makes it possible to exclude signals with a frequency of greater than 50 KHz whereby only the variations in the signal AS with a frequency of less than 50 KHz are detected.

The combining circuit 25 in turn comprises a first operational amplifier 31 which at its non-inverting input receives the output signal from the positive-peak detector produced with the amplifier 27. The amplifier 31 on the other hand, at its inverting input, receives the output signal from the negative-peak detector which is provided by the amplifier 28. The output signal of the amplifier 31 therefore performs the function (Vmax-Vmin) AO wherein AO is the gain given by the ratio R8/R7.

The circuit 25 further comprises an operational summing amplifier 32 which at its inverting input, by way of a resistor R9, receives the reference voltage Vr. The latter, apart from the constant introduced by the ratio between the resistors R10/R9, is generated by a variable resistor RV3 which thus forms the reference voltage generator 24.

The same inverting input of the amplifier 32, by way of a variable resistor RV2, receives the negative output voltage of the amplifier 28. The output signal of the amplifier 32 thus performs the function Vmin.A1+Vr.R10/R9 wherein A1 is the gain given by the ratio R10/RV2. The voltage Vr is selected in such a way as to add to the combination of the above-mentioned signals a direct-current component which prevents the threshold signal from falling below the value Vr. In that way the arrangement ensures that, under particular conditions, the circuit 17 does not generate binary signals due to casual or noise variations in the signal AS. Preferably the gain AO is selected to be 0.5 and RV2 is adjusted in such a way as to have a gain A1=1 whereby the functions produced by the two amplifiers 31 and 32, apart from the constant of the resistors R10/R9, represent the average of the values of Vmax and Vmin.

Finally the circuit 25 comprises a third operational amplifier 34, the non-inverting input of which receives the output signals of the amplifiers 31 and 32 in parallel by way of the resistors R13 and R14. At its inverting input, by way of a resistor R16, the amplifier 34 receives the signal Va.A2 which is present at the output of the amplifier 29 wherein A2 is the gain of the amplifier 29 which is normally less than 0.5. Preferably A2 is selected to be 0.25.

The output of the amplifier 34 therefore produces the algebraic sum of the functions of the three amplifiers 31, 32 and 34, thereby resulting in the output signal representing the threshold signal: $Vs=(Vmax-Vmin)AO+Vmin\ A1+Va.A2+Vr$.

The comparator 26 with hysteresis now continuously compares the threshold signal Vs to the signal AS coming directly from the circuit 19 (see FIG. 1). It eliminates any transient results of the comparison and issues a bit one if AS<Vs while it emits a bit zero if AS>Vs. It will be clear therefore that the signal in respect of the pixel is thus compared to a threshold signal which is automatically adjusted in dependence on the positive-peak and negative-peak signals which are previously received in the scanning operation, and in dependence on the current signal in respect of the pixel and the reference signal.

FIG. 4 shows the diagram with a time base T of a signal AS which is generated during the scanning of two windows or successive scanning operations spaced by a time interval TR during which the circuit 17 is deactivated. The window signal is indicated on the time axis T by W1 for the first window and W2 for the second window. The diagram Vmax indicated in broken line almost instantly follows the rising slopes of the signal AS while between one positive peak and another it falls slowly in accordance with the discharge time constant of the positive-peak detector 21 (see also FIG. 3) until it meets a subsequent rising slope of the signal AS. Similarly the diagram Vmin which is also shown in broken lines rises slowly in accordance with the discharge time constant of the negative-peak detector 22 until it meets a falling slope of the signal AS. From that point the value Vmin almost instantly follows that slope until the subsequent negative peak, after which the value Vmin begins to rise slowly again.

The threshold signal Vs produced with the above-described algorithm is indicated by a dash-dotted line in FIG. 4. As already stated, by virtue of the reference voltage Vr, the value of the threshold signal Vs will never be lower than Vr.

During the time TR the detectors 21 and 22 retain the respective signals Vmax and Vmin. Therefore when scanning of the window W2 is effected, the two detectors 21 and 22 start from the condition attained whereby the diagrams in respect of Wmax, Wmin and Vs assume the configuration indicated in FIG. 4.

The curve in respect of the threshold signal Vs meets the curve in respect of the signal AS at a number of points, the abscissae of which give the times T1, T2 . . ., in which the comparator 26 switches providing the binary output signal. That binary signal is then stored in the buffer 14 (see FIG. 1) and can be applied to the output circuit 16 alternatively with the digital six bit signal (32 levels).

It should be noted that the output circuit 16 can make available at the output, under the control of the control unit 11, a binarised signal taken from the six bit output line from the buffer 14 by means of a selector 20 controlled by the control unit 11, corresponding to a preselected one of the sixty four available levels defined by the A/D converter 12, alternatively with the binarised signal from the threshold circuit 17.

We claim:

1. A circuit for automatically regulating the background threshold of a reading signal for a digital image scanning device comprising:
    means for scanning the pixels, capable of generating corresponding electrical reading signals and transmitting them in series to the regulating circuit,
    and memory means controlled by the regulating circuit for storing digital values of the signal in binary mode in dependence on the threshold,
    said regulating circuit including a positive-peak detector, a negative peak detector, respectively for detecting the positive peak $V_{max}$ and negative peak $V_{min}$ of the signals received from the scanning means,
    and combining means for generating a linear combination $V_s$ of the signals detected by said detectors, said combining means being operable to generate the combination Vs also in dependence on the analog signal Va of the pixel and on a predetermined reference signal Vr to develop a binary signal which can be stored in said memory.

2. A circuit according to claim 1, wherein the binary signal is generated by a comparator (26) with hysteresis, which compares the threshold signal ($V_s$) to the pixel reading signal (AS).

3. A circuit according to claim 2 wherein each of the detectors (21, 22) has a very short charge time constant and a much longer discharge time constant.

4. A circuit according to claim 3 wherein each of the detectors (21, 22) comprises a capacitor ($C_1$, $C_2$) having a charge time constant equivalent to the time for reception of the signals of a few pixels, the discharge time constant of each capacitor ($C_1$, $C_2$) being at least 200 times the charge time constant.

5. A circuit according to claim 4, wherein the positive-peak detector (21) has a discharge time constant of at least five times the discharge time constant of the negative-peak detector (22).

6. A circuit according to any of claim 1, wherein the combining means (25) produce an average of the peak signals, means ($RV_2$) being provided for experimentally varying the parameter of said average.

7. A circuit according to claim 6, wherein adjusting means are provided for varying the parameter of the pixel signal in said combining means.

8. A circuit according to claim 1, wherein the detectors (21, 22) can be enabled by switch means sensitive to the density of the pixels to be read.

* * * * *